Nov. 12, 1968 ZENZI MURAKAMI 3,410,165
SPIRAL UPSTANDING PROJECTING BLADE ON CUTTER ROLLER
FOR CONTINUOUS CHEMICAL FIBER CUTTING APPARATUS
Filed Feb. 10, 1967 2 Sheets-Sheet 1
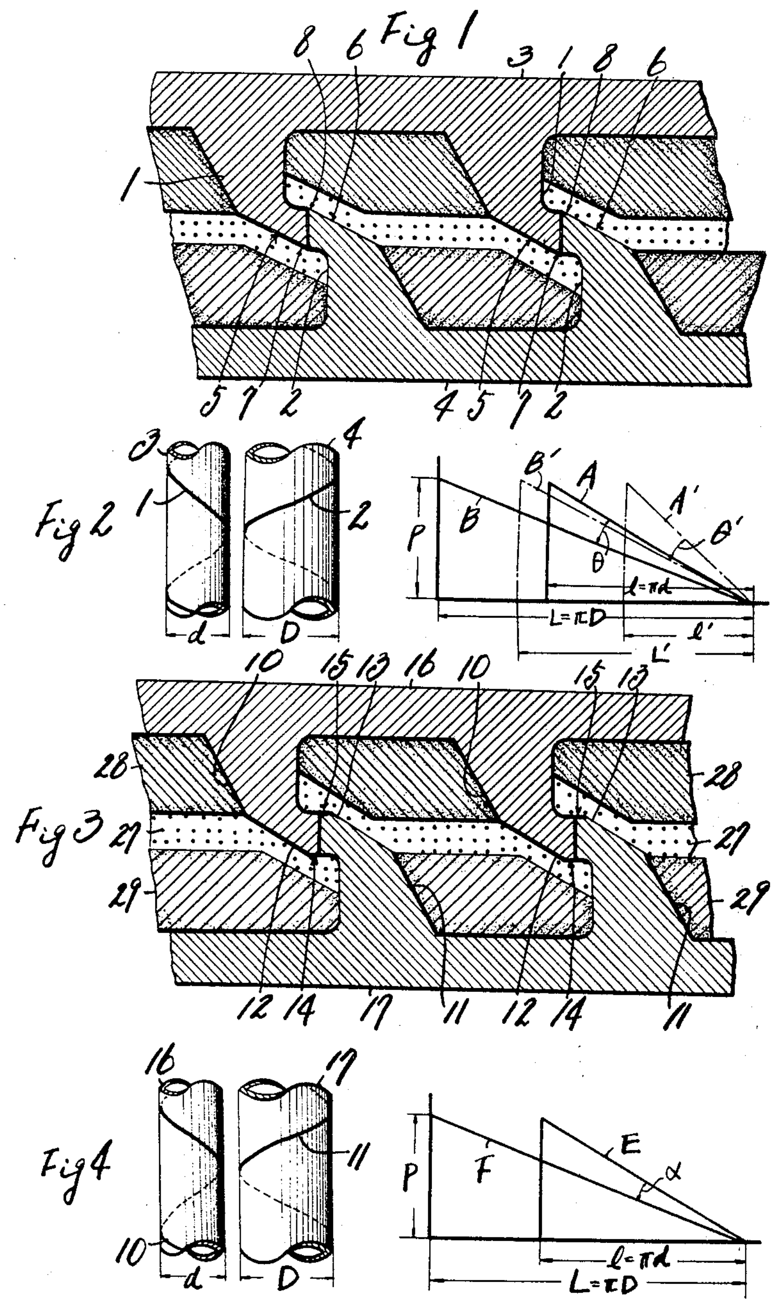
ZENZI MURAKAMI,
INVENTOR,
BY Hall & Houghton Nov. 12, 1968 ZENZI MURAKAMI 3,410,165
SPIRAL UPSTANDING PROJECTING BLADE ON CUTTER ROLLER FOR CONTINUOUS CHEMICAL FIBER CUTTING APPARATUS
Filed Feb. 10, 1967 2 Sheets-Sheet 2
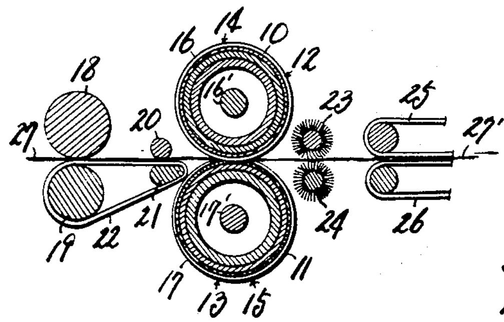
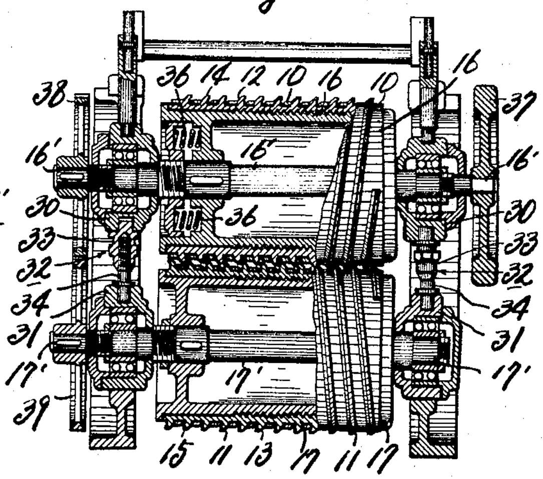
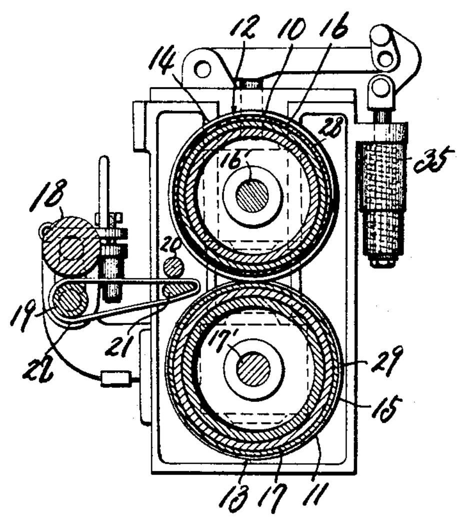
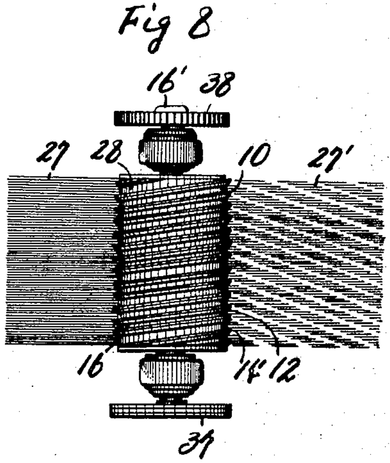
ZENZI MURAKAMI,
INVENTOR.
BY [signature]

United States Patent Office 3,410,165
Patented Nov. 12, 1968

1

3,410,165

SPIRAL UPSTANDING PROJECTING BLADE ON CUTTER ROLLER FOR CONTINUOUS CHEMICAL FIBER CUTTING APPARATUS

Zenzi Murakami, Osaka-shi, Osaka-fu, Japan, assignor to Osaka Kiko Kabushiki Kaisha, Osaka-shi, Japan Filed Feb. 10, 1967, Ser. No. 615,218
Claims priority, application Japan, Dec. 23, 1966, 41/117,297
1 Claim. (Cl. 83—342)

ABSTRACT OF THE DISCLOSURE

Cooperating cutting rolls that have helically mounted cutting blades. The blades have flat edges on their periphery to prevent breakage and to maintain a constant cross angle of contact.

This invention relates to improvements in a spiral upstanding projecting blade on a cutter roller for con tinuous chemical fiber tow cutting apparatuses.

In the accompanying drawings:

FIG. 1 is a fragmentary enlarged sectional view of a pair of known upper and lower cutter rollers, illustrating the sectional shape of the known spiral upstanding projecting blade;

FIG. 2 shows the meshing relation of the upper and lower spiral upstanding projecting blades when the upper and lower cutter rollers shown in FIG. 1 are in meshing position;

FIG. 3 is a fragmentary enlarged sectional view of a pair of upper and lower cutter rollers according to the present invention, illustrating the sectional shape of the improved spiral upstanding projecting blade;

FIG. 4 shows the meshing relation of the upper and lower spiral upstanding projecting blades when the upper and lower cutter rollers are in meshing position;

FIG. 5 is a side view of a continuous chemical fiber tow cutting apparatus incorporating the spiral upstanding projecting blades according to the invention;

FIG. 6 is an enlarged longitudinal sectional view of the upper and lower cutter rollers;

FIG. 7 is a side view, in longitudinal section taken on the line VI—VI of FIG. 6; and FIG. 8 shows the conditions of fibers after cutting. In addition, the known continuous chemical fiber tow cutting apparatus is the same in structure as that shown in FIGS. 5 through 7, except for the sectional shape of the spiral upstanding projecting blades of the upper and lower cutter rollers. Hence the illustration thereof is omitted.

The known form of continuous chemical fiber tow cutting apparatus cuts supplied tow with upstanding projecting blades 1 and 2 of the construction shown in FIG. 1. Thus, the upstanding projecting blades of the sectional shape shown in FIG. 1 are spirally wound around upper and lower cutter rollers 3 and 4 with the same pitch P. The upstanding projecting blades 1 and 2 have lip clearances 5 and 6, respectively, and their front edge 7 and 8 are pointed. Thus, they exhibit good sharpness immediately after the manufacture of the cutter rollers, but after they have been used for several hours their cutting ability lowers for the following reason.

2

Due to the fact that the upper and lower upstanding projecting blades 1 and 2 are pressed against each other with a suitable cross angle (detailed explanation of such cross angle being given hereinafter) so as to maintain close contact with each other and that the peripheral speeds of the cutter rollers are made to differ from each other by providing a difference between the diameters $d$ and D of the respective upper and lower cutter rollers 3 and 4 to effect the rubwise rotation of these upper and lower upstanding cutting edges 1 and 2 thereby to improve the ability to cut supplied tow, a high degree of resistance is consequently imposed on the cross rubbing areas of the upper and lower upstanding projecting blades, and also due to the fact that the front edges 7 and 8 are in a sharp pointed form, nicking of edges easily tends to occur upon cutting. Actually, with the upstanding projecting blades shown in FIG. 1, the front edges thereof will fracture after several hours of service. If nicking of edges occurs as mentioned above, the accuracy of circularity of the upper and lower cutting edges is adversely affected, forming the cause of miscutting. Further, even if assuming that the aforesaid known upstanding projecting blades gradually wear uniformly throughout the lateral contact areas thereof while thus ideally keeping the circularity without ever causing nicking of edges, there is still involved therein the following disadvantage. That is, when the upper and lower upstanding projecting blades 1 and 2 wear in uniform proportion throughout the lateral peripheries thereof without nicking of edges, the existence of the lip clearances 5 and 6 naturally brings about a gradual decrease in the diameters $d$ and D of the upper and lower cutter rollers 3 and 4. Therefore, the meshing depth of the upstanding projecting blades 1 and 2 of the upper and lower cutter roller becomes shallower and shallower until at last perfect cutting of supplied tow becomes impossible. Furthermore, the aforesaid gradual decrease of the diameters of the upper and lower cutter rollers in uniform proportion causes a serious drawback which follows. This drawback shall be explained with reference to FIG. 2 which illustrates the meshing relation of the spiral upstanding projecting blades 1 and 2 of the upper and lower cutter rollers 3 and 4, the lines A and B indicating the spiral angles of the upstanding projecting blades 1 and 2 of the upper and lower cutter rollers, respectively, prior to cutting operation. In FIG. 2, the horizontal axis indicates the length of the outer circumference of each cutter roller and the vertical axis indicates the meshing pitch of the upstanding projecting blade of each cutter roller, it being noted that the pitch is the same for both the upper and lower cutter rollers and remains unchanged. The outer circumferential lengths $l$ and L of the respective upper and lower cutter rollers gradually decrease with decreasing diameters $l$ and L.

In this figure, a cross angle $\theta$ formed between the lines A and B is the one which provides the predetermined highest degree of sharpness and the best conditions to provide against wearing of the upper and lower cutter rollers. However, as the diameters of the upper and lower gradually decrease with cutting operation, the outer circumferential lengths $l$ and L of the upper and lower cutter rollers decrease to $l'$ and L' and hence the spiral angles of the respective upstanding projecting blades are increased as shown at lines A' and B' in FIG. 2. As the result, the cross angle $\theta$ is increased to $\theta'$. As the cross angle $\theta$ varies in this way, the rubwise rotation of the upstanding projecting blades 1 and 2 of the upper and lower cutter rollers is blocked and wearing of said upstanding projecting blades becomes more violent.

To sum up, in the case of the known upstanding projecting blades shown in FIG. 1, the circularity is lost in a short period of time due to the unstable or irregular wear, and even if they wear uniformly while ideally keeping the circularity, the cross angle between the upper and lower upstanding projecting blades varies so that the wear in said upper and lower projecting blades becomes more violent. Thus there exist mutually incompatible conditions and under these circumstance it is therefore impossible to obtain a satisfactory cutting roller which gives long service.

The present invention eliminates the aforesaid disadvantages and provides improvements, the object being to provide a cutter roller having an upstanding projecting blade adapted to maintain the circularity without being nicked, wherein the diameter of the cutter roller is not caused to decrease by wear and the cross angle of upper and lower such cutter rollers determined at the time of manufacture will remain unchanged forever.

The essence of the invention resides in the provision of flat areas 14 and 15 on the front edges 12 and 13 of upstanding projecting blades 10 and 11, respectively, as shown in FIG. 3. The construction of the spiral upstanding projecting blades in this manner provides the following advantages.

Since the front edges 12 and 13 of the upstanding projecting blades 10 and 11 are in the form of the flat areas 14 and 16 as shown in FIG. 3, nicking of edges will hardly occur. Actually, almost no nicking of edges occurs even after an extended period of service. Therefore, there is no possibility of degrading the circularity otherwise occurrable due to nicking of edges and hence miscutting of supplied tow can in no way occur. Further, the upper and lower upstanding projecting blades are pressed against each other with a suitable cross angle maintained therebetween so as to keep close contact with each other and the upper and lower upstanding projecting blades 10 and 11 are rotating rubwise due to a difference in the diameters of the upper and lower cutter rollers. As a result, even if the lateral surfaces of the upper and lower upstanding projecting blades wear in uniform proportion, the diameters $d$ and D of the upper and lower cutter rollers are maintained constant, so far as the flat areas survive, and therefore the difference in peripheral speed and the meshing condition of the upstanding projecting blades will not vary, assuring that cutting of supplied tow is not adversely affected. Further, in the present invention since the diameter $d$ and D of the upper and lower cutter rollers will not vary, as mentioned above, the spiral angles of the upstanding projecting blades of the upper and lower cutter rollers are maintained constant until the flat areas are worn out, as shown at lines E and F in FIG. 4. Accordingly, the cross angle 2 is unchanged. Thus, it is possible to permanently maintain a cross angle at the value at which it was set at the time of design. That is, it is possible to cut supplied tow under the same, unchanged cutting conditions from beginning to end until the flat areas are worn out.

To sum up, only by providing flat areas on the front edges of upper and lower upstanding projecting blades, the present invention assures that the sharpness is permanently unchanged, no nicking of edges occurs, the circularity is permanently maintained and the cross angle remains constant, thus giving long service. That is, it is possible to obtain a cutter roller wherein the conditions under which it was designed will never change.

The arrangement of the invention will now be more fully described with reference to the drawings.

The diameter $d$ of the upper cutter roller 16 is somewhat smaller than the diameter D of the lower cutter roller 17. The upstanding projecting blades are spirally wound around the cuter rollers 16 and 17, respectively, with the same pitch P. The directions of winding for the upstanding projecting blades 10 and 11 are opposite to each other. The reference numerals 18, 19 and 20 designate feed rollers; 21, a guide bar; 22, a feed belt (leather, rubber or the like; 23 and 24, brush rollers; and 25 and 26, endless transfer belts. A bunch of continuous chemical fibers, namely, supplied tow 27 is passed through the feed rollers 18 and 19 onto the feed belt 22 and it is then supplied from between the feed roller 20 and the guide bar 21 to the upper and lower cutter rollers 16 and 17. It is obliquely cut by the action of the crosswise rubbing of the upper and lower cutter rollers at their circumscribed region. Thus it is delivered in the form of fixed length fibers 27′ disposed side by side, is arranged in the predetermined form as it is rubbed by passing through the upper and lower brush roller 23 and 24 and is transferred to the subsequent process as it is gripped in that form of fiber arrangement by the upper and lower endless transfer belts 25 and 26, as shown in FIG. 8. The spiral upstanding projecting blades 10 and 11 on the cutter rollers 16 and 17 have their front edges 12 and 13 formed with flat areas 14 and 15 as shown in FIG. 3 and have band-like bodies 28 and 29 of soft elastic material such as rubber wound and embedded in the bottoms of the grooves. These soft elastic band-like bodies 28 and 29 serve to exactly compress and hold the bunch of fibers 27 in the instant of cut, so that there is no possibility that the arrangement of the fixed length fibers 27 is disturbed.

Bearings 30 and 31 for the upper and lower rollers 16 and 17 are held at a fixed distance by means of adjusters 32, as shown in FIG. 6. Each adjuster 32 consists of a female screw sleeve 33 and a male screw rod 34 screwed therein. By turning the female screw sleeve 33 relative to the male screw rod 34, the length of the whole adjuster is changed, so that the meshing depth of the upper and lower upstanding projecting blades 10 and 11 can be varied. As shown in FIG. 7, the shaft 16′ of the upper cutter roller 16 is urged down by means of a spring 35. Further, the upper cutter roller 16 is constantly urged axially (to the right as seen in FIG. 6) on the shaft 16′ by means of a spring 36. As a result, the upstanding projecting blade 10 of the upper cutter roller 16 is pressed against the lateral surface of the upstanding projecting blade 11 of the lower cutter roller 17 to establish rub contact therewith, so that the bunch of fibers 27, upon entering the contact region between the upper and lower cutter rollers 16 and 17, is sheared by the upper and lower upstanding projecting blades 10 and 11. The upper cutter roller 16 is driven by a pulley 37 and the lower cutter roller 17 is driven by a gear 39 secured on the shaft 17′ of the lower cutter roller 17 and meshing with a gear 38 secured on the shaft 16′ of the upper cutter roller 16. The gears 38 and 39 have the same number of teeth, so that the upper and lower cutter rollers are rotated with the same number of revolutions in opposite directions. Since the diameter of the lower cutter roller 17 is somewhat larger than that of the upper cutter roller 16, as mentioned above, there is a difference in peripheral speed, or angular velocity, in the rubbing contact condition of the upper and lower upstanding projecting blades 10 and 11 at the circumscribed region of the upper and lower cutter rollers 16 and 17. Since the bunch of fibers 27 is sheared in this condition by the upper and lower upstanding projecting blades 10 and 11, the cutting can be effected very smoothly without the danger of causing miscut.

While in the above has been described an instance in which two cutter rollers, in pair, are arranged one upon the other, such two cutter rollers may be arranged horizontally or obliquely as contacted in pair.

What is claimed is:

1. An upstanding projecting blade on a cutter roller for a continuous chemical fiber cutting apparatus wherein a set of two cutter rollers of different diameters provided with upstanding projecting blades wound thereon with the same pitch and rotating with the same number of revolutions are arranged in such a manner as to allow their upstanding projecting blades to make cross contact with each other so that a bunch of fiber passing through said pair of cutter rollers is cut by the action of the crosswise pressure contact rubbing motion of the upstanding projecting blades on the pair of cutter rollers, said upstanding projecting blade being characterized in that the front edges of two such upstanding blades are each provided with flat areas whereby the cross angle of the pair of upstanding projecting blades is maintained constant.

References Cited

UNITED STATES PATENTS

| | | | |
|---|---|---|---|
| 1,318,892 | 10/1919 | Maier | 83—342 X |
| 2,077,079 | 4/1937 | Taylor et al. | 19—.62 X |
| 2,172,359 | 9/1939 | Campbell | 83—342 |
| 2,234,105 | 3/1941 | Ashton et al. | 83—342 |
| 3,000,250 | 9/1961 | Altmann et al. | 83—345 X |
| 3,304,821 | 2/1967 | Matino et al. | 83—342 X |

ANDREW R. JUHASZ, *Primary Examiner.*

FRANK T. YOST, *Assistant Examiner.*